United States Patent [19]

Kaehler

[11] 4,438,806
[45] Mar. 27, 1984

[54] HEAT EXCHANGER FOR TRANSFERRING HEAT TO A LIQUID

[75] Inventor: Dieter Kaehler, Berlin, Fed. Rep. of Germany

[73] Assignee: Alfa-Laval Agrar GmbH, Hamburg, Fed. Rep. of Germany

[21] Appl. No.: 292,816

[22] Filed: Aug. 14, 1981

Related U.S. Application Data

[63] Continuation-in-part of Ser. No. 105,769, Dec. 20, 1979, Pat. No. 4,305,454.

[30] Foreign Application Priority Data

Dec. 20, 1978 [DE] Fed. Rep. of Germany ....... 2854999

[51] Int. Cl.³ ............................ F24H 1/20; F28D 1/04
[52] U.S. Cl. .................................... 165/108; 165/132; 219/279; 219/314; 219/316; 219/321
[58] Field of Search .............. 122/32, 406 B; 165/108, 165/132, 163; 219/312, 314, 316, 320, 321, 279

[56] References Cited

U.S. PATENT DOCUMENTS

| | | | |
|---|---|---|---|
| 2,403,272 | 7/1946 | Freer | 165/163 |
| 2,576,603 | 11/1951 | Hines et al. | 219/312 X |
| 2,804,534 | 8/1957 | Coates | 219/314 |
| 3,251,401 | 5/1966 | Gardner | 165/108 X |
| 3,448,792 | 6/1969 | Lawrence | 165/108 X |
| 3,730,261 | 5/1973 | Clark, Jr. | 165/108 X |
| 3,782,335 | 1/1974 | Hecktor | 219/314 X |
| 3,856,078 | 12/1974 | Dahl | 165/108 |

FOREIGN PATENT DOCUMENTS

| | | | |
|---|---|---|---|
| 2625501 | 12/1977 | Fed. Rep. of Germany | 219/279 |
| 542906 | 3/1956 | Italy | 165/108 |
| 54-99246 | 8/1979 | Japan | 219/314 |
| 513820 | 10/1939 | United Kingdom | 219/314 |
| 2037975 | 7/1980 | United Kingdom | 219/314 |

Primary Examiner—Sheldon J. Richter
Attorney, Agent, or Firm—Peter K. Kontler

[57] ABSTRACT

A heat exchanger wherein an insulating upright jacket contains a body of relatively cold liquid and spacedly surrounds a hollow upright hollow cylindrical heat conducting body which, in turn, spacedly surrounds a helical heating body confining a flowing heating medium. The upper and lower ends of the heat conducting body are open so that cold liquid can enter the heat conducting body from below to exchange heat with the medium in the helical heating body, to thereby rise in the heat conducting body, and to issue at the upper end of the heat conducting body. The upper end of the heat conducting body has a flow restrictor which defines an outlet opening for the heated liquid. An electric heater can be installed in the jacket to heat the liquid when the supply of warmer medium is insufficient.

13 Claims, 4 Drawing Figures

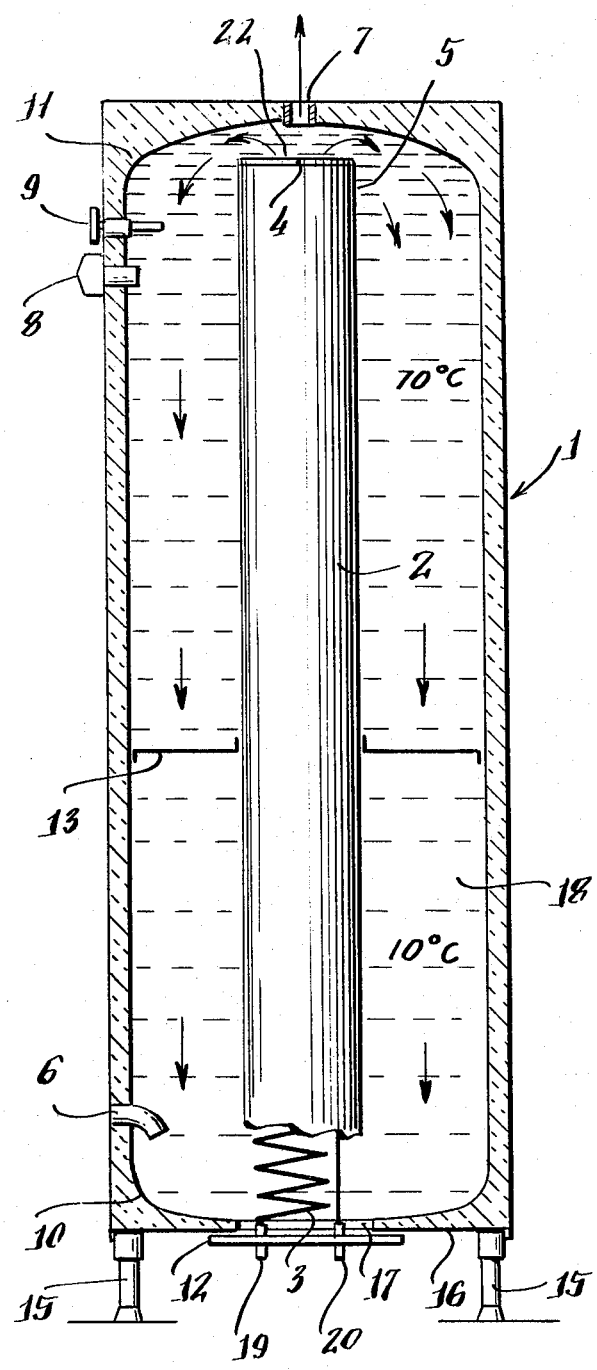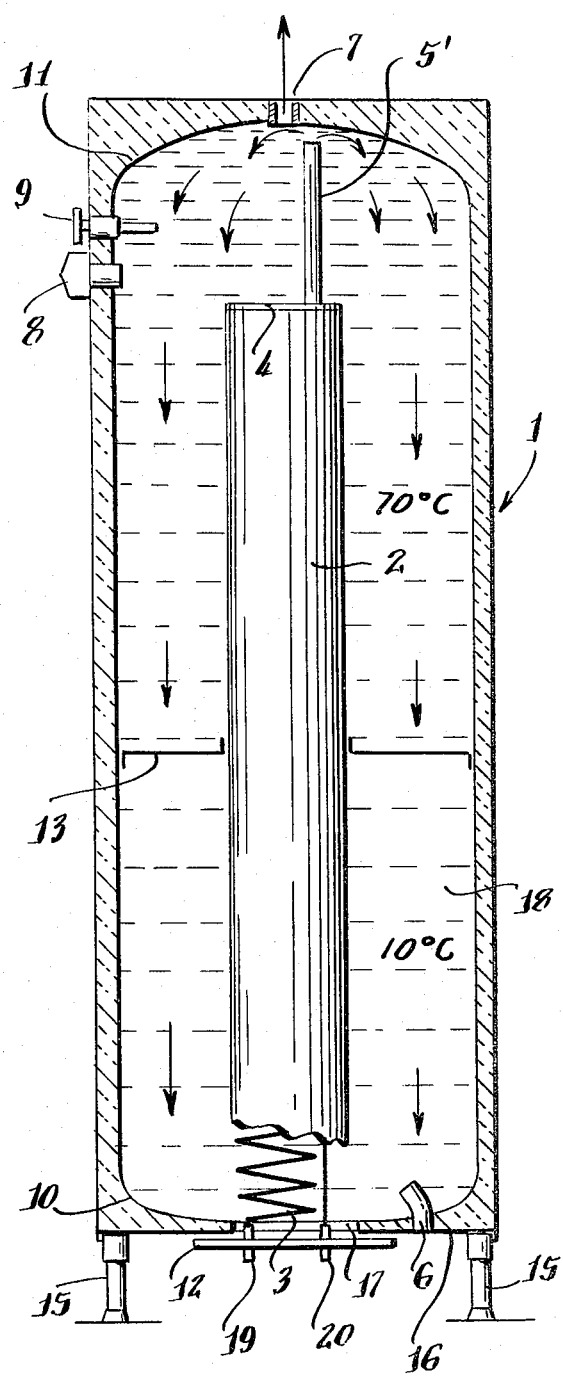

HEAT EXCHANGER FOR TRANSFERRING HEAT TO A LIQUID

CROSS-REFERENCE TO RELATED APPLICATION

This is a continuation-in-part of my copending application Ser. No. 105,769 filed Dec. 20, 1979 and entitled "Heat Exchanger", now U.S. Pat. No. 4,305,454 granted Dec. 15, 1981.

BACKGROUND OF THE INVENTION

The present invention relates to a heat exchanger for transferring the heat content of a warm medium to a liquid to be heated, with a substantially upright insulated outer jacket and a heat conducting body that guides the flow of cooling liquid and is located in a space surrounded by the outer jacket.

Heat exchangers of this type serve particularly for the reclaiming of heat from heated cooling media, from waste water and from naturally warm media whose heat content could heretofore be utilized only with difficulty. Attempts at the reclaiming of such heat have met with limited success because the cost of necessary equipment is very high in comparison with the quantity of reclaimed heat. In view of the relatively small temperature gradient it was necessary, as a rule, to operate with large heating surfaces. As of late, heat exchangers which are suited for the above outlined purposes have again gained in importance in view of the rising cost of energy and increasing demands for environmental protection.

OBJECTS AND SUMMARY OF THE INVENTION

It is an object of the present invention to improve heat exchangers of the aforementioned type in such a way that high efficiency is achieved at a small temperature difference and with relatively small quantities of the warmer medium.

Another object of the invention is to provide a simple, compact and reliable heat exchanger of the above outlined type.

In accordance with the present invention, the heat conducting body surrounds a heating body, which is traversed by the warmer medium, and constitutes a wall that separates the liquid to be heated by the heating body from the remaining portion of the space in the jacket of the heat exchanger. The liquid to be heated rises as a result of heating from an inlet opening at the lower end toward an outlet opening at the upper end of the heat conducting body.

With the aid of the heat conducting body, a relatively small percentage of liquid is separated from the total body of liquid to be heated and is brought into immediate contact with the heating body. Consequently, such small percentage of liquid, which is surrounded by the heat conducting body is intensely heated by the heating body in that it is prevented from mixing with the remainder of the liquid to be heated. As a result of such heating, the liquid to be heated rises so that colder liquid can enter from below into the heat conducting body, e.g., a cylinder. In this manner, a stream flows through the heat conducting body with the result that the warmed-up liquid emerges at the upper part of the heat conducting body and forms a layer on the cooler fluid which is confined in the lower part of the jacket of the heat exchanger. The temperature of the warmer liquid renders it possible to economically utilize the same. Such warmer liquid is withdrawn from the upper part of the heat exchanger without being permitted to mix with the cold liquid that is fed into the lower part of the jacket. This is ensured by the aforementioned stratification of liquids in the jacket.

According to a presently preferred embodiment of the invention, the outlet opening throttles the flow of liquid from the heat conducting body. This prevents excessive flow of liquid through the heat conducting body, namely, at a rate such that the temperature at the outlet opening would not be sufficient for the purposes of use. By appropriate selection of the throttling opening, the rate of flow in the heat conducting body can be selected in such a way that the temperature at the outlet opening can be selected with a high degree of accuracy within the framework of the thermodynamic possibilities of heat exchange.

The novel features which are considered as characteristic of the invention are set forth in particular in the appended claims. The improved heat exchanger itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a longitudinal sectonal view of a heat exchanger with a heat conducting body which is open at its upper end;

FIG. 2 is a longitudinal sectional view of a heat exchanger with a riser tube which closes the heat conducting body at the top;

DESCRIPTION OF THE PREFERRED EMBODIMENTS

Figure 4:
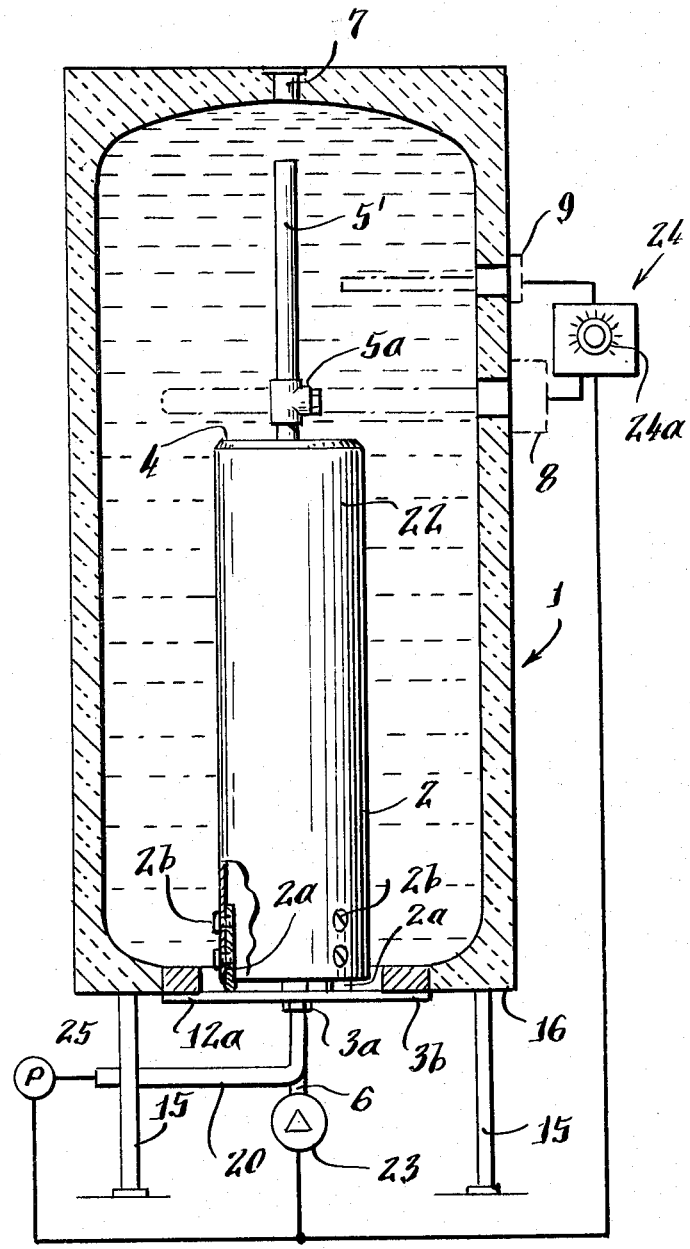
FIG. 4 is a longitudinal sectional view of the embodiment of FIG. 3 in a plane at right angles to the plane of FIG. 3.

The heat exchanger of FIG. 1 comprises a jacket 1, a heat conducting body 2, and a heating body 3 which constitutes a heat exchanger. The jacket 1 is substantially upright and is mounted on legs 15 which are connected to the marginal portions of the bottom wall 16 of the jacket 1. The bottom wall 16 has an opening 17 whose cross-sectional area is selected in such a way that the heat conducting body 2 and the heating body 3 can be introduced therethrough and into the interior 18 of the jacket 1. The opening 17 is sealed by a bottom plate 12. The heating body 3 is connected to the bottom plate 12 so that the inlet 20 and the outlet 19 for the warm medium which flows through the body 3 extend through the bottom plate 12. The heating body 3 is a helix the diameter of which corresponds approximately to the inner diameter of the cylindrical heat conducting body 2. In the embodiment of FIG. 1, the dimensions of the heating body 3 are selected in such a way that its convolutions do not touch the internal surface of the heat conducting body 2. Thus, there is room for the flow of a fluid (a liquid which fills the heat conducting body 2) between the helix and the internal surface of the heat conducting body 2.

The lower part of the jacket 1 is formed with an inlet opening 6 for cold liquid. The opening 6 is located immediately above the rounded marginal portion 10 of the upper side of the bottom wall 16, but such opening can also be provided in the bottom wall 16 immediately adjacent to the plate 12. Since the liquid to be heated should enter the inlet opening of the heat conducting body 2 from all sides, the body 2 is preferably concentric with the jacket 1.

The upper end of the heat conducting body 2 has an outlet opening 22 for the warmed-up liquid which flows in a direction toward the interior 18 of the jacket 1. When the flow distribution within the heat conducting body 2 is uniform, the warmed-up liquid enters the interior 18 from all sides of the body 2 and forms a layer on top of the cold liquid which fills the lower part of the jacket 1. At the highest point of a dome-shaped upper wall 11 of the jacket 1, there is provided an outlet opening 7 through which the warm liquid can be withdrawn from the interior 18. A thermometer 9 indicates the prevailing temperature of the warm liquid.

The heating medium, for example, the heated-up cooling fluid in a closed circuit which is not shown in detail, is introduced into the helix of the heating body 3 at the inlet 20 and is conducted away at the outlet 19. Such medium flows through the helix and transmits heat to the liquid to be heated, i.e., to the liquid which surrounds the heating body 3 within the heat conducting body 2. As a result of heating action, the liquid which fills the interior of the heat conducting body 2 rises therein and forms a stream flowing toward the upper wall 11. Thus, the liquid in the lower part of the body 2 is preheated by liquid in the lower part of the heating body 3 and such liquid flows between and around further convolutions of the helical heating body 3 so that it is progressively heated in accordance with the amount of heat made available by the warm medium and in dependency on the temperature level, with long dwell in the heat conducting body 2. The thus heated liquid issues from the opening 22 of the heat conducting body 2 and is discharged at all sides onto the cold liquid in the lower part of the interior 18 so that the warmed-up liquid forms a layer on the cold liquid. Depending on the demand, the warmed-up liquid can be withdrawn by way of the opening 7. The prevailing temperature is indicated by the thermometer 9.

The temperature of the liquid to be heated can be regulated by a throttling passage 5 which is formed at the opening 22 of the heat conducting body 2 in that the latter is closed by a throttling plate 4 except for the desired path along which heated liquid flows into the jacket 1. By proper selection of the throttling passage 5, warm liquid is confined in the interior of the heat conducting body 2 until it has reached the desired temperature. If the temperature of liquid flowing through the opening 7 of the heat exchanger is to vary, the top of the body 2 is provided with means for adjusting the passage 5, e.g., with means for moving the plate 4 up or down.

In FIG. 2, the throttling means comprises a riser tube 5' which enhances the uniformity of distribution of the liquid to be heated. Moreover, the riser tube 5' can be mounted eccentrically with respect to the cylindrical heat conducting body 2 in order to prevent the flow of heated fluid from the riser tube 5' and directly into the opening 7.

The heat conducting body 2 can be held in the interior 18 of the jacket 1 with the aid of supporting braces 13. These supporting braces 13 are preferably configurated and dimensioned to offer negligible resistance to the flow of liquid in the interior 18 of the jacket 1. The braces 13 further reduce the likelihood of damage to the heat exchanger during transport by preventing bending of the heating body 3 and of the heat conducting body 2.

In addition to the mounting of the heating body 3 on the bottom plate 12, it is desirable to support the body 3 in the interior of the heat conducting body 2. In this manner, the helix is secured in the heat conducting body 2 in such a way that it cannot suffer any damage, even during long distance transport of the heat exchanger on uneven ground.

It is important to ensure that the heat conducting body 2 be made so small that the heating body barely fits into its interior. In this manner, the volume of the heat conducting body 2 is relatively small so that the liquid which is present therein and is to be warmed up can be rapidly heated. Consequently, it is possible to establish and maintain a pronounced upward flow which results in desirable heat exchange with the heating body 3. Should the medium which serves to heat the liquid be unavailable in sufficient quantities or at the desired temperature, a pump can be provided to enhance the flow which develops in the heat conducting body 2. The pump then takes care of the necessary circulation speed and thus contributes to improved heat transfer. In addition it is possible to provide an electric heating device 8 in the interior 18 of the jacket 1. The device 8 may constitute a conventional electric resistance heater; its exposed outer portion comprises or constitutes a thermostatic control unit, and the device 8 can be turned on to assist the heating action of the body 3 when the amount of heat supplied by the liquid in the body 3 is too low. The device 8 ensures the availability of an adequate supply of hot liquid in the upper part of the jacket 1, in an economical manner, to always have a constant supply of heat available at the upper part of the heat exchanger.

The heat conducting body 2 may be made of a metallic or other material. When the material is a metal, heat transfer from the heat conducting body 2 to the cooling liquid in the jacket 1 must be taken into account. On the other hand, certain synthetic plastic materials and ceramics act as insulators so that satisfactory warming-up of the liquid to be heated within the heat conducting body 2 can be anticipated even at a small temperature difference. Especially in such cases, it is important to maintain the heat content of liquid in the heat conducting body 2 at a value such that a natural flow of the liquid which is being heated can develop within the heat conducting body 2. For this reason, it is then desirable to make the heat conducting body 2 from a material which constitutes a poor heat conductor.

The mode of operation of the novel heat exchanger is independent of the construction of the bottom plate 12. If desired, the heat conducting body 2 and the heating body 3 can be introduced into the jacket 1 in a different way. For example, it is possible to introduce the heat conducting body 2 and the heating body 3 into jacket 1 from above. In such apparatus, the upper wall 11 must be provided with a large opening corresponding to the opening 17, and a cover plate must be provided to close the opening in the upper wall and to support the parts 2 and 3.

The reference character 6 denotes in FIG. 2 a pipe which supplies liquid to be heated into the lower portion of the interior 18 of the jacket 1. The flow of liquid through the pipe 6 (e.g., from a water tap or another suitable source of liquid to be heated) can be controlled by a suitable regulating valve 6a (see FIG. 3) which is actuated by hand or by an automatic control unit, not shown, e.g., in dependency on the rate of withdrawal or discharge of heated liquid from the jacket 1 via opening 7.

The heat conducting body 2 and the flow restrictor (plate 4 and/or riser 5') have thermally insulating walls.

Figure 3:
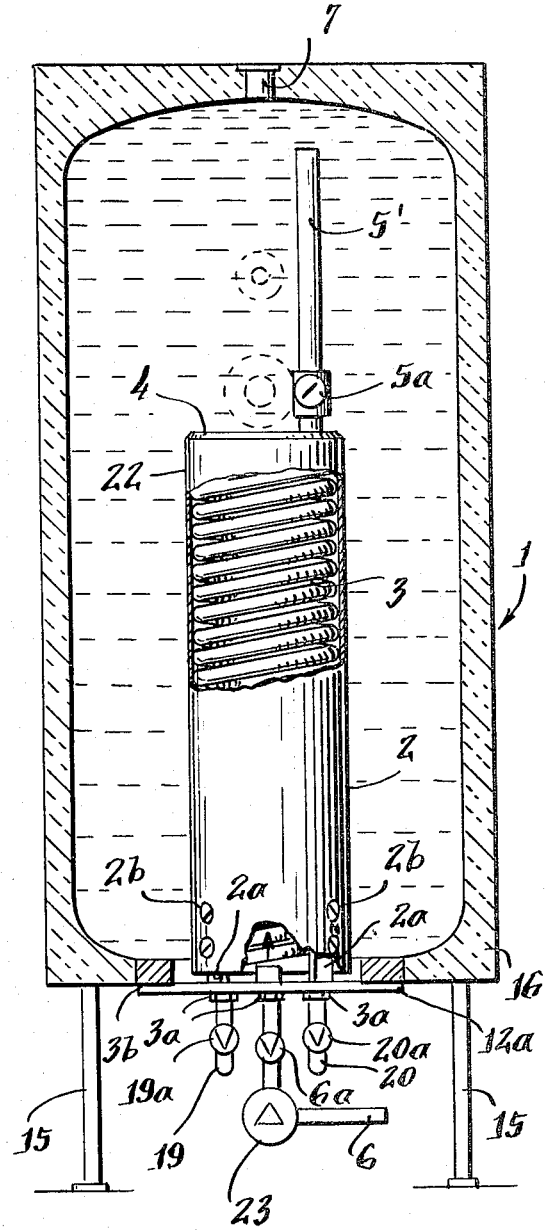
FIG. 3 is a longitudinal sectional view of another embodiment of the invention.

The heat exchanger of FIGS. 3 and 4 has a riser tube 5' provided with an adjusting screw 5a which, depending upon the direction in which it is rotated, can increase or reduce the rate of liquid flow in the pipe 5'. The screw 5a can change the angular position of a flap or another suitable valving element in the pipe 5'. Thus, the screw 5a controls the flow of liquid from the heat conducting body 2 through tube 5'. When the screw 5a is used to reduce the effective cross-sectional area of the tube 5', the temperature of liquid issuing from the tube 5 will necessarily be increased since the liquid is forced to remain in the body 2 for a longer interval of time. The converse is true if the screw 5a is used to increase the effective cross-sectional area of the pipe 5', e.g., all the way to a maximum value when the resistance to the flow of liquid through the pipe 5' equals or approximates zero.

The throttling device (i.e., the tube 5 and the plate 4) and the heat conducting body 2 are assumed to be made of a material which is a poor conductor of heat for reasons explained hereinabove. The thermal insulation factor thus obtained facilitates heating of liquid in the body 2 by the heating body 3 without losses in transfer of heat from heated liquid in the body 2 to the cooler liquid which surrounds the components 2, 4 and 5 and is confined in the jacket 1.

The temperature range that may be attained in the heat conducting body 2 is further maximized by the size and design thereof. It should be noted that the heating body 3 is mounted within the body 2 and rests with one side against the inner wall of the body 2; at the opposite side, the body 3 is spaced apart from the inner wall of body 2 by a small clearance. In other words, the inner diameter of the body 2 is only negligibly greater than the diameter of body 3. In comparison to the jacket 1, the body 2 holds only about one tenth of the overall liquid volume which is confined in the jacket 1. Stated differently, the volumetric ratio of the body 2 to the jacket 1 is 1:10. As indicated earlier, an advantage of such small size of the body 2 relative to the jacket 1 is that only a small percentage of the overall volume of liquid to be heated is brought into direct contact with the body 2. This facilitates an intensive heating of the liquid which is brought into such contact.

In the embodiment of FIGS. 3-4, the bottom plate 12a holds supporting legs 2a which replace the braces 13. The legs 2a extend upwardly from the plate 12a and are connected to the body 2 by screws 2b which may be welded to the body 2. This enables the user to remove, in one single step, the basic heat exchanger unit from the jacket 1 without having to detach it from the braces 13 as in FIG. 2. Connectors 3a are nuts and washers which surround the inlet tube 6, the outlet 19 and the inlet 20; the nuts are located at the outer side of the plate 12a and the washers on the inner side thereof. Similar nut-and-washer connectors 3b secure the bottom plate 12a to the bottom wall 16 of jacket 1.

In this, as in other embodiments, the electric heater and thermostat 8 may be combined with the thermometer 9 to form a single unit. Furthermore, a control mechanism 24 (FIG. 4) may be connected to the heater/thermostat 8, the pump 23 for admission of liquid into the jacket 1 via tube 6, the pump 25 which supplies liquid to the heating body 3, and the throttle adjustment screw 5a. The control mechanism 24 is designed (in a manner known per se) to automatically maintain the temperature of the liquid in the upper portion of the jacket 1 (via a thermostat) at a desired value. It further enables the user, by manipulating a dial 24a of the mechanism 24, to raise or lower the temperature of such liquid. Manipulation of the dial 24a can affect any or all of the heat control mechanisms, i.e., rate of liquid delivery by the pump 23, change of effective cross-sectional area of the riser tube 5' by screw 5a, flow of a hot gas or liquid through the body 3 on actuation of the pump 25 and/or the heating action of the heater/thermostat 8.

The inlet 20 and outlet 19 respectively contain valves 20a and 19a which allow for manual or remote-control regulation of admission of warmer medium into or evacuation of warmer medium from the heating body 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A heat exchanger for transferring heat from a warmer medium to a liquid to be heated, comprising a substantially upright insulated jacket defining an internal space containing the liquid to be heated; a hollow heat conducting body disposed in the interior of said jacket and arranged to guide the liquid to be heated; a heating body traversed by the warmer medium and at least paritally surrounded by said heat conducting body, said heat conducting body separating the liquid which is heated in the interior thereof as a result of heat exchange with the warmer medium in said heating body from the liquid in the internal space of said jacket and said heat conducting body having a lower end provided with an inlet opening for admission of liquid to be heated from said internal space and an upper end provided with a flow restrictor defining an outlet opening for the liquid which is heated in the interior of and rises in said heat conducting body, said heat conducting body and said flow restrictor having thermally insulating walls; a thermometer for sensing the temperature of liquid in said jacket; means for adjusting said flow restrictor; an electric heater for heating the liquid in the jacket; a thermostat for controlling the heater; a first pump for admitting liquid into said heat conducting body; a second pump for admitting warm medium into said heating body; and control means operatively connected to said thermometer, said adjusting means, said heater, said thermostat and said pumps for maintaining the temperature of liquid in said jacket at a desired level.

2. The heat exchanger of claim 1, wherein the volume of said heat conducting body is substantially less than the volume of said jacket.

3. The heat exchanger of claim 1, wherein the ratio of the volume of said heat conducting body to the volume of said jacket is approximately 1:10.

4. The heat exchanger of claim 1, wherein said jacket includes a bottom plate and said heating body has an inlet, said bottom plate having an inner side and an outer side and further comprising washers and nuts located at the opposite sides of and securing said inlet to said bottom plate.

5. The heat exchanger of claim 4, wherein said jacket has a lower portion with an opening which is sealed by said bottom plate.

6. The heat exchanger of claim 4, wherein said bottom plate is removable.

7. The heat exchanger of claim 4, further comprising fluid flow regulating valve means mounted on said bottom plate, and supporting legs for said jacket, said legs being secured to said bottom plate.

8. The heat exchanger of claim 1, wherein said jacket has a bottom part defining an opening large enough to allow for insertion or removal of said heat conducting body and said heating body.

9. The heat exchanger of claim 8, wherein the diameter of said opening in said bottom part only slightly exceeds the outer diameter of said heat conducting body.

10. The heat exchanger of claim 1, wherein said heating body is suspended in said heat conducting body so that one side of the heating body rests against the inner surface of the heat conducting body.

11. The heat exchanger of claim 1, wherein said heat conducting body has an inner diameter only negligibly larger than the outer diameter of said heating body.

12. The heat exchanger of claim 1, wherein said control means includes a dial which enables a user to manually adjust the temperature of liquid by adjusting any of the components to which said control means is operatively connected.

13. The heat exchanger of claim 1, wherein said control means includes a dial which enables a user to manually adjust the temperature of liquid by adjusting all of the components to which said control means is operatively connected.

* * * * *